United States Patent
Donthi

(10) Patent No.: US 7,697,419 B1
(45) Date of Patent: Apr. 13, 2010

(54) APPARATUS AND METHOD FOR MANAGING A SET OF SWITCHES IN A COMPUTER NETWORK

(75) Inventor: Praveen Donthi, Sunnyvale, CA (US)

(73) Assignee: Allied Telesyn International Corporation, Bothell, WA (US)

( * ) Notice: Subject to any disclaimer, the term of this patent is extended or adjusted under 35 U.S.C. 154(b) by 1317 days.

(21) Appl. No.: 10/302,476

(22) Filed: Nov. 22, 2002

(51) Int. Cl.
*G06F 11/00* (2006.01)

(52) U.S. Cl. ............. 370/220; 370/255; 370/386; 370/445

(58) Field of Classification Search ......... 370/254–258, 370/352, 360, 216, 217, 218, 219, 220, 221, 370/386, 387, 388, 445, 446, 447, 449, 462
See application file for complete search history.

(56) References Cited

U.S. PATENT DOCUMENTS

| | | | | |
|---|---|---|---|---|
| 5,819,090 | A * | 10/1998 | Wolf et al. | 719/320 |
| 5,920,257 | A * | 7/1999 | Commerford | 340/506 |
| 6,137,774 | A * | 10/2000 | Commerford et al. | 370/216 |
| 6,160,795 | A * | 12/2000 | Hosemann | 370/256 |
| 6,597,691 | B1 * | 7/2003 | Anderson et al. | 370/360 |
| 6,628,649 | B1 * | 9/2003 | Raj et al. | 370/360 |
| 6,775,246 | B1 * | 8/2004 | Kuribayashi et al. | 370/257 |
| 6,822,944 | B1 * | 11/2004 | Mantin | 370/254 |
| 6,876,643 | B1 * | 4/2005 | Aggarwal et al. | 370/338 |
| 7,002,938 | B2 * | 2/2006 | Hester et al. | 370/330 |
| 7,042,897 | B1 * | 5/2006 | Sivaprakasam et al. | 370/462 |
| 7,133,403 | B1 * | 11/2006 | Mo et al. | 370/390 |
| 7,171,476 | B2 * | 1/2007 | Maeda et al. | 709/227 |
| 7,209,358 | B2 * | 4/2007 | Garnett et al. | 361/735 |
| 7,221,661 | B2 * | 5/2007 | Matsui et al. | 370/324 |
| 7,242,677 | B2 * | 7/2007 | Hong | 370/346 |
| 7,277,409 | B1 * | 10/2007 | Thermond et al. | 370/328 |
| 7,324,462 | B1 * | 1/2008 | Page et al. | 370/255 |
| 7,349,360 | B2 * | 3/2008 | Gutierrez et al. | 370/315 |
| 7,420,952 | B2 * | 9/2008 | da Costa et al. | 370/338 |

\* cited by examiner

*Primary Examiner*—Pankaj Kumar
*Assistant Examiner*—Mark A Mais
(74) *Attorney, Agent, or Firm*—Cooley Godward Kronish LLP

(57) ABSTRACT

An apparatus to manage a set of switches in a computer network is described. In particular, a computer-readable medium to direct a computer network to function in a specified manner is provided. The computer-readable medium comprises instructions to configure a first switch of a set of switches as a first master switch and instructions to identify a first plurality of switches of the set of switches that are connected to the first master switch. The first plurality of switches includes a second switch and a third switch, and the second switch can be configured as a second master switch. The computer-readable medium also comprises instructions to modify an operational parameter associated with the third switch using the first master switch.

18 Claims, 12 Drawing Sheets

APPARATUS AND METHOD FOR MANAGING A SET OF SWITCHES IN A COMPUTER NETWORK

BRIEF DESCRIPTION OF THE INVENTION

The present invention relates generally to computer networks. More particularly, the present invention relates to managing a set of switches in a computer network.

BACKGROUND OF THE INVENTION

A computer network typically includes various interconnected network devices such as client computers, server computers, terminals, printers, and so forth. A common type of computer network is a Local Area Network ("LAN"), which typically can span one or more buildings. Examples of LANs include computer networks based on Ethernet, Asynchronous Transfer Mode ("ATM"), token ring, and Fiber Distributed Data Interconnect ("FDDI") technologies. Several LANs can be connected to form a larger network, such as a larger LAN. In certain situations, LANs that are located at different physical locations can be connected via a type of computer network typically referred to as a Wide Area Network ("WAN").

A computer network, such as a LAN, can include a switch to direct data to various network devices of the computer network. A common type of switch includes multiple ports to which one or more network devices can be connected. A switch can perform switching operations by, for example, receiving and transmitting data through one or more of its multiple ports. In order to accommodate increasing demands for data traffic in a computer network, several switches can be connected to form a stack of switches.

Attempts have been made to manage a stack of switches through use of a primary switch. Use of a primary switch can simplify management of a stack of switches by providing a common point for monitoring as well as configuring switching operations performed by various switches of the stack of switches. While providing some benefits associated with use of a primary switch, previous attempts have typically suffered from one or more shortcomings. In particular, previous attempts often required dedicated hardware in the form of a dedicated management bus or a dedicated management hardware unit, which can increase both the cost and the complexity for managing a stack of switches. Also, previous attempts sometimes provided limited flexibility in network design by requiring switches to be located in close proximity to one another, such as in a single wiring closet, or by requiring each switch to be directly connected to a primary switch in order to be managed. And, some of the previous attempts limited the total number of switches in a stack of switches to an inadequate level, thus undesirably limiting the number of switches that can be managed using a primary switch. In addition, previous attempts typically provided limited management flexibility by restricting the ability to select and configure a different switch as a primary switch or by limiting a stack of switches to having one primary switch at a given time that can be used to manage the stack of switches.

It is against this background that a need arose to develop the apparatus and method described herein.

SUMMARY OF THE INVENTION

In one innovative aspect, the present invention relates to a computer-readable medium to direct a computer network to function in a specified manner. In one embodiment, the computer-readable medium comprises instructions to configure a first switch of a set of switches as a first master switch and instructions to identify a first plurality of switches of the set of switches that are connected to the first master switch. The first plurality of switches includes a second switch and a third switch, and the second switch can be configured as a second master switch. The computer-readable medium also comprises instructions to modify an operational parameter associated with the third switch using the first master switch.

In another embodiment, the computer-readable medium comprises a stacking state module to configure a first switch of a set of switches as a first master switch and a stacking administration module to identify a plurality of switches of the set of switches that are connected to the first master switch. The plurality of switches includes a second switch and a third switch. The second switch can be configured as a second master switch, and the third switch can be configured as a slave switch. The computer-readable medium also comprises a stacking services module to modify an operational parameter associated with one of the second master switch and the slave switch using the first master switch.

In another innovative aspect, the present invention relates to a method of managing a computer network. In one embodiment, the method comprises configuring a first switch of a set of switches as a first master switch and configuring a second switch of the set of switches as a second master switch. The method also comprises modifying an operational parameter associated with a third switch of the set of switches using one of the first master switch and the second master switch.

BRIEF DESCRIPTION OF THE DRAWINGS

For a better understanding of the nature and objects of the invention, reference should be made to the following detailed description taken in conjunction with the accompanying drawings, in which.

DETAILED DESCRIPTION

Figure 1:
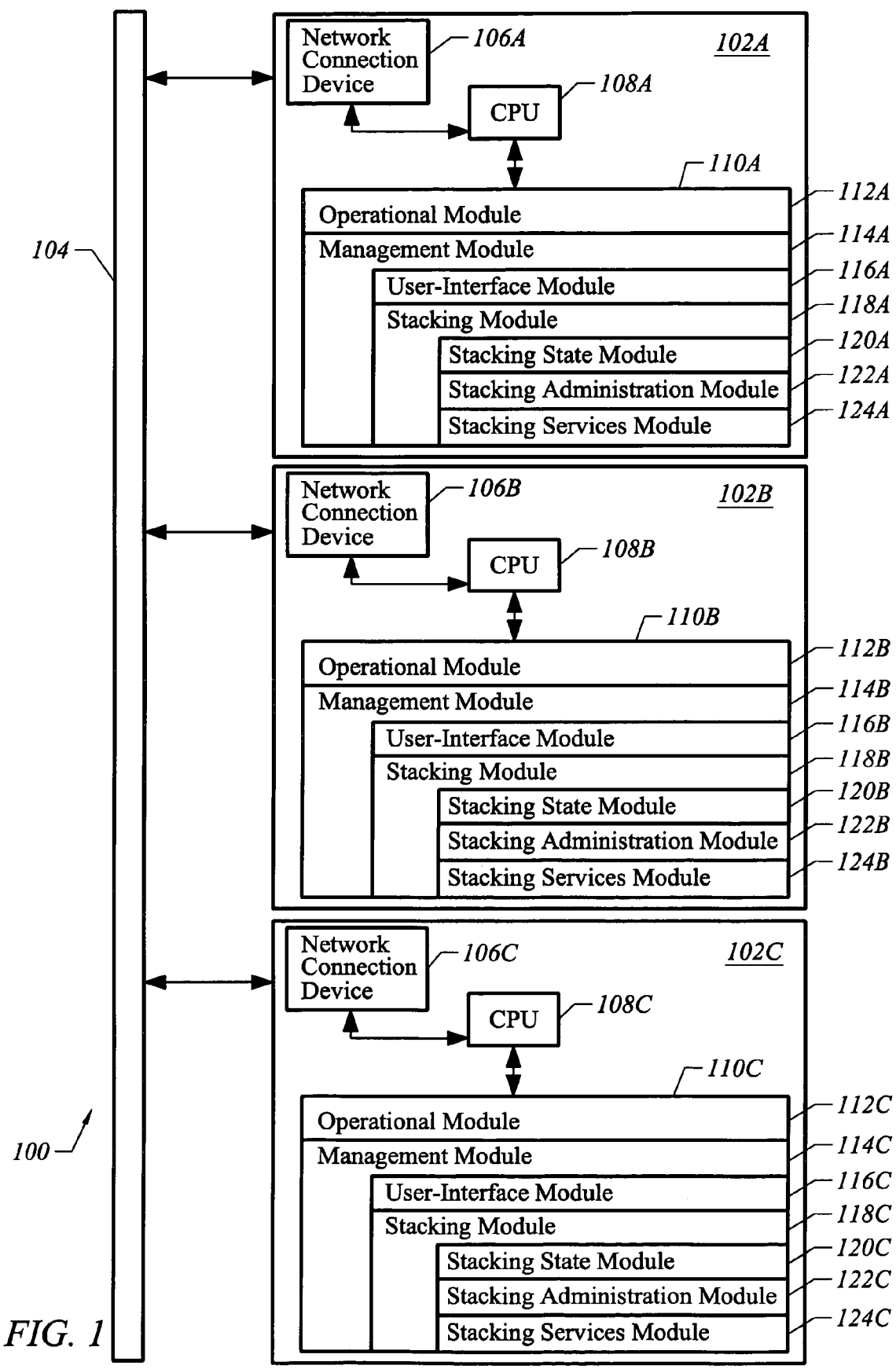
FIG. 1 illustrates a computer network that can be managed in accordance with an embodiment of the invention.

FIG. 1 illustrates a computer network 100 that can be managed in accordance with an embodiment of the invention. The computer network 100 includes a set of switches 102A, 102B, and 102C that can be connected to form a stack of switches. The computer network 100 can represent a LAN in which various network devices (not shown in FIG. 1), such as client computers, server computers, terminals, printers, and so forth, are connected to one or more of the switches 102A, 102B, and 102C. The switches 102A, 102B, and 102C in the present embodiment of the invention can be, for example, OSI Layer 2 switches (e.g., Ethernet switches) and can direct communication among the various network devices by performing switching operations, including receiving and transmitting data typically in the form of data frames (e.g., Ethernet frames). In addition to directing communication among the various network devices of the computer network 100, one or more of the switches 102A, 102B, and 102C can provide access to another computer network, such as a different LAN or a WAN.

As shown in FIG. 1, the switches 102A, 102B, and 102C are connected by a transmission channel 104, which, in general, can be any wire or wireless transmission channel. In the present embodiment of the invention, the transmission channel 104 can include one or more conventional network cables (e.g., Ethernet cables) that can be used to connect the switches 102A, 102B, and 102C using a variety of network topologies, such as a cascade topology or a star topology. In particular, the switches 102A, 102B, and 102C can be connected using a cascade topology by, for example, connecting the switch 102A to the switch 102B using a conventional network cable and connecting the switch 102B to the switch 102C using a conventional network cable. Depending on the particular application, two or more of the switches 102A, 102B, and 102C can be located in a wiring closet or can be located at different physical locations, such as, for example, at different floors of a building or at different buildings.

As shown in FIG. 1, the switch 102A includes a Central Processing Unit ("CPU") 108A that is connected to a network connection device 106A and a memory 110A. The network connection device 106A can include one or more ports (e.g., Ethernet ports) to which one or more network devices can be connected. Data frames can be received or transmitted through one or more ports of the network connection device 106A. In the present embodiment of the invention, one or both of the switches 102B and 102C can be connected to the switch 102A using one or more ports of the network connection device 106A.

The memory 110A stores a number of computer programs, including an operational module 112A to direct various operations of the switch 102A. In particular, the operational module 112A can direct various operations of the switch 102A in accordance with a set of operational parameters. In the present embodiment of the invention, the set of operational parameters includes operational parameters associated with various switching operations performed by the switch 102A. For instance, the set of operational parameters can include operational parameters associated with one or more ports of the network connection device 106A, such as, for example, an operating speed of a port, a duplex mode of a port, an operating status of a port, and so forth. One or more operational parameters may be associated with default settings that can be modified by a user as discussed below.

The memory 110A also stores a management module 114A, which includes a set of sub-modules that implement specific processing steps that can be performed in accordance with the present embodiment of the invention. The management module 114A is configured to direct management of the switch 102A by, for example, allowing a user to view, modify, or configure one or more operational parameters associated with the switch 102A. In the present embodiment of the invention, the management module 114A is also configured to direct management of another switch (e.g., the switch 102B or 102C) that is connected, directly or indirectly, to the switch 102A by, for example, allowing the user to view, modify, or configure one or more operational parameters associated with this other switch. And, the management module 114A of the present embodiment of the invention is configured to allow the switch 102A to be managed by another switch that is connected, directly or indirectly, to the switch 102A.

As shown in FIG. 1, the management module 114A includes a user-interface module 116A and a stacking module 118A. The user-interface module 116A allows a user to specify one or more operational parameters to be viewed or modified, which operational parameters can be associated with the switch 102A or another switch that is managed using the switch 102A. In the present embodiment of the invention, the user-interface module 116A can display one or more operational parameters and allows the user to specify a modification to one or more operational parameters. In connection with managing another switch using the switch 102A, the user-interface module 116A allows the user to specify a variety of processing options associated with the stacking module 118A, which is discussed below.

The user-interface module 116A can be accessed using a variety of techniques. For instance, the user-interface module 116A can be accessed by connecting (e.g., directly connecting) a terminal or a computer with a terminal emulator program to a port (e.g., a RS-232 terminal port) of the switch 102A. The user-interface module 116A also can be accessed by any network device in the computer network 100 (or another computer network) that is connected to the switch 102A using, for example, a Telnet application protocol, a web browser, or a Simple Network Monitoring Protocol ("SNMP") program. For certain applications, an Internet Protocol ("IP") address is typically assigned to the switch 102A to allow the user-interface module 116A to be accessed using, for example, a Telnet application protocol or a web browser. In the present embodiment of the invention, the user-interface module 116A also can be accessed by using another switch (e.g., the switch 102B or 102C) in the computer network 100 that has been configured as a master switch as discussed below.

The stacking module 118A is configured to direct management of another switch that is connected to the switch 102A. As shown in FIG. 1, the stacking module 118A includes a stacking state module 120A, a stacking administration module 122A, and a stacking services module 124A. The stacking state module 120A can be used to configure the switch 102A as a master switch. Once the switch 102A has been configured as a master switch, the stacking administration module 122A is configured to identify one or more switches of the computer network 100 that are connected to the switch 102A, such as, for example, the switches 102B and 102C. The stacking services module 124A is configured to allow a user to view or modify an operational parameter associated with one or both of the switches 102B and 102C using the switch 102A. In a complementary fashion, the stacking module 118A of the present embodiment of the invention is also configured to allow the switch 102A to be managed by another switch that is connected to the switch 102A.

In the present embodiment of the invention, the switches 102B and 102C have configurations that are similar to that of the switch 102A. It should be recognized, however, that one, or both, of the switches 102B and 102C can be configured in an alternate fashion relative to the switch 102A. As shown in FIG. 1, the switch 102B includes a network connection device 106B, a CPU 108B, and a memory 110B, which stores an operational module 112B and a management module 114B (including its various sub-modules). In a similar fashion, the switch 102C includes a network connection device 106C, a CPU 108C, and a memory 110C, which stores an operational module 112C and a management module 114C (including its various sub-modules).

The present embodiment of the invention operates, at least in part, by having the switches 102A, 102B, and 102C observe a set of stacking protocols. The set of stacking protocols is incorporated in the stacking modules 118A, 118B, and 118C and is further discussed below. In accordance with the present embodiment of the invention, a first switch (e.g., the switch 102A) can be configured as a first master switch, which can then be used to view as well as modify a variety of operational parameters associated with another switch (e.g., the switch 102B or 102C) that is connected to the first master switch. If desired, a second switch (e.g., the switch 102B) can be configured as a second master switch, which can then be used to view as well as modify a variety of operational parameters associated with another switch (e.g., the switch 102A or 102C) that is connected to the second master switch.

Advantageously, two or more switches can be configured as master switches, thus allowing for enhanced flexibility in managing the computer network 100. For instance, a user can select among multiple master switches to manage various switches of the computer network 100. Also, multiple users can access multiple master switches to manage the computer network 100 at a given time. Having multiple master switches also provides enhanced redundancy in managing the computer network 100 in the event of failure or inaccessibility of one of the master switches. For instance, in the event one of the master switches is inaccessible, a user can access another master switch to manage the computer network 100 without having to first configure a switch as a master switch.

While FIG. 1 illustrates three switches 102A, 102B, and 102C, it should be recognized that more or less switches can be included in the computer network 100 depending on the particular application. In particular, the set of stacking protocols of the present embodiment of the invention allows for a virtually unlimited number of switches that can be connected and managed as discussed herein. For instance, depending on the number of network devices, demand for data traffic, and physical boundary associated with the computer network 100, the computer network 100 can include 17 or more switches (e.g., at least 20, at least 30, or at least 40 switches) that are connected by the transmission channel 104. Additional switches in the computer network 100 can be similarly configured and managed as discussed for the switches 102A, 102B, and 102C.

Figure 2:
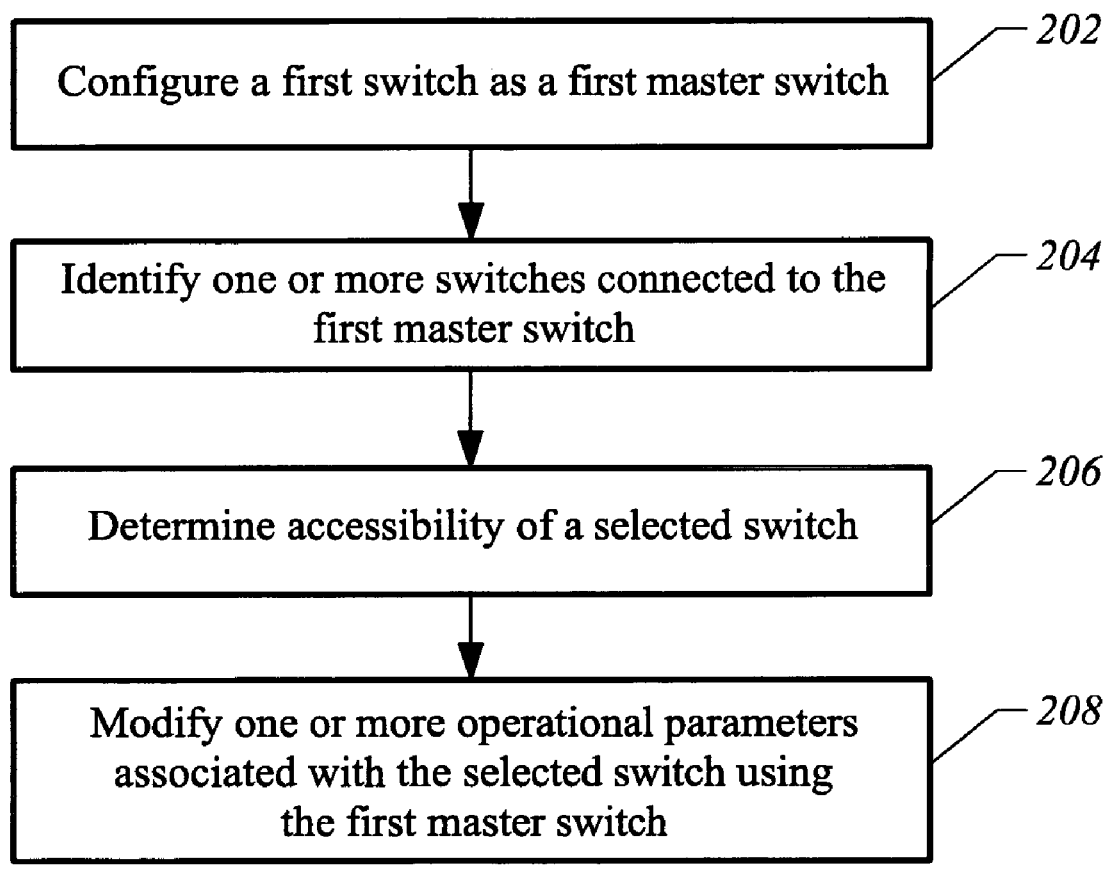
FIG. 2 illustrates processing steps that can be performed to manage a computer network in accordance with an embodiment of the invention.

Attention now turns to FIG. 2, which illustrates processing steps that can be performed to manage a computer network (e.g., the computer network 100) in accordance with an embodiment of the invention. The first processing step shown in FIG. 2 is to configure a first switch (e.g., the switch 102A) as a first master switch (step 202). In particular, a stacking state module (e.g., the stacking state module 120A) of the first switch defines a set of switch states associated with the first switch. The set of switch states can include a master switch state, a slave switch state, and an unavailable switch state. In the present embodiment of the invention, a master switch state refers to a stacking configuration where a switch typically can manage as well as be managed by another switch. A slave switch state refers to a stacking configuration where a switch typically will not manage but can be managed by another switch. An unavailable switch state refers to a stacking configuration where a switch typically will neither manage nor be managed by another switch. The stacking state module of the first switch can receive a user-specified selection of one of the master switch state, the slave switch state, and the unavailable switch state to configure the first switch as a master switch (e.g., a first master switch), a slave switch, or an unavailable switch, respectively. In the present embodiment of the invention, the stacking state module of the first switch receives a user-specified selection of the master switch state to configure the first switch as the first master switch.

The second processing step shown in FIG. 2 is to identify one or more switches (e.g., the switches 102B and 102C) that are connected to the first master switch (step 204). A switch that is identified can be configured (e.g., pre-configured) as a master switch, a slave switch, or an unavailable switch. For instance, a switch that is identified can be configured as a second master switch or a slave switch. The present embodiment of the invention allows for a greater number of switches that can be connected to and managed by the first master switch than previously achievable. For instance, in accordance with step 204, at least 16 switches can be identified as being connected to the first master switch. In accordance with step 204, a stacking administration module (e.g., the stacking administration module 122A) of the first master switch directs the first master switch to communicate with one or more switches in accordance with a stacking discovery protocol. In the present embodiment of the invention, the first master switch transmits one or more polling signals to one or more switches that are connected to the first master switch. The first master switch then receives one or more acknowledgment signals, transmitted in response to the one or more polling signals, from one or more switches. Further details regarding the stacking discovery protocol, the polling signal, and the acknowledgment signal are discussed below.

The third processing step shown in FIG. 2 is to determine accessibility of a selected switch (e.g., the switch 102B) that is identified from step 204 (step 206). In particular, the stacking administration module of the first master switch receives a user-specified selection of an identified switch from step 204. The stacking administration module of the first master switch then directs the first master switch to communicate with the selected switch in accordance with a stacking administration protocol. In the present embodiment of the invention, the first master switch transmits an access request signal to the selected switch. The first master switch then receives a response signal, transmitted in response to the access request signal, from the selected switch. In the present embodiment of the invention, a variety of response signals can be received by the first master switch, including an access response signal, an access error signal, an access switch-in-use signal, and an access switch-not-accessible signal. An access response signal is used to indicate that the selected switch is accessible for management by the first master switch, while an access error signal, an access switch-in-use signal, and an access switch-not-accessible signal are used to indicate that the selected switch is not accessible for management by the first master switch. Further details regarding the stacking administration protocol, the access request signal, and the various response signals are discussed below.

The fourth processing step shown in FIG. 2 is to modify one or more operational parameters associated with the selected switch using the first master switch (step 208). In particular, a stacking services module (e.g., the stacking services module 124A) of the first master switch directs the first master switch to communicate with the selected switch in accordance with a stacking services protocol. In general, various types of data can be transmitted between the first master switch and the selected switch to allow the selected switch to be managed using the first master switch. In particular, data associated with one or more operational parameters of the selected switch can be transmitted between the first master switch and the selected switch to allow a user to view or modify the one or more operational parameters. Also, data incorporating a computer program (e.g., an updated version of an operational module or a management module) can be transmitted from the first master switch to the selected switch to allow a user to download the computer program to the selected switch. For some embodiments of the invention, data incorporating a computer program can be transmitted using, for example, a File Transfer Protocol ("FTP") program or a Trivial File Transfer Protocol ("TFTP") program. Further details regarding the stacking services protocol are discussed below.

In a similar fashion as discussed in connection with step 202 through step 208, a second switch (e.g., the switch 102B) can be configured as a second master switch and can be used to manage another switch (e.g., the switch 102A or 102C) that is connected to the second master switch. In the present embodiment of the invention, either, or both, of the first switch and the second switch can be configured as a master switch, thus allowing for enhanced flexibility and redundancy in managing the computer network.

Figure 7:
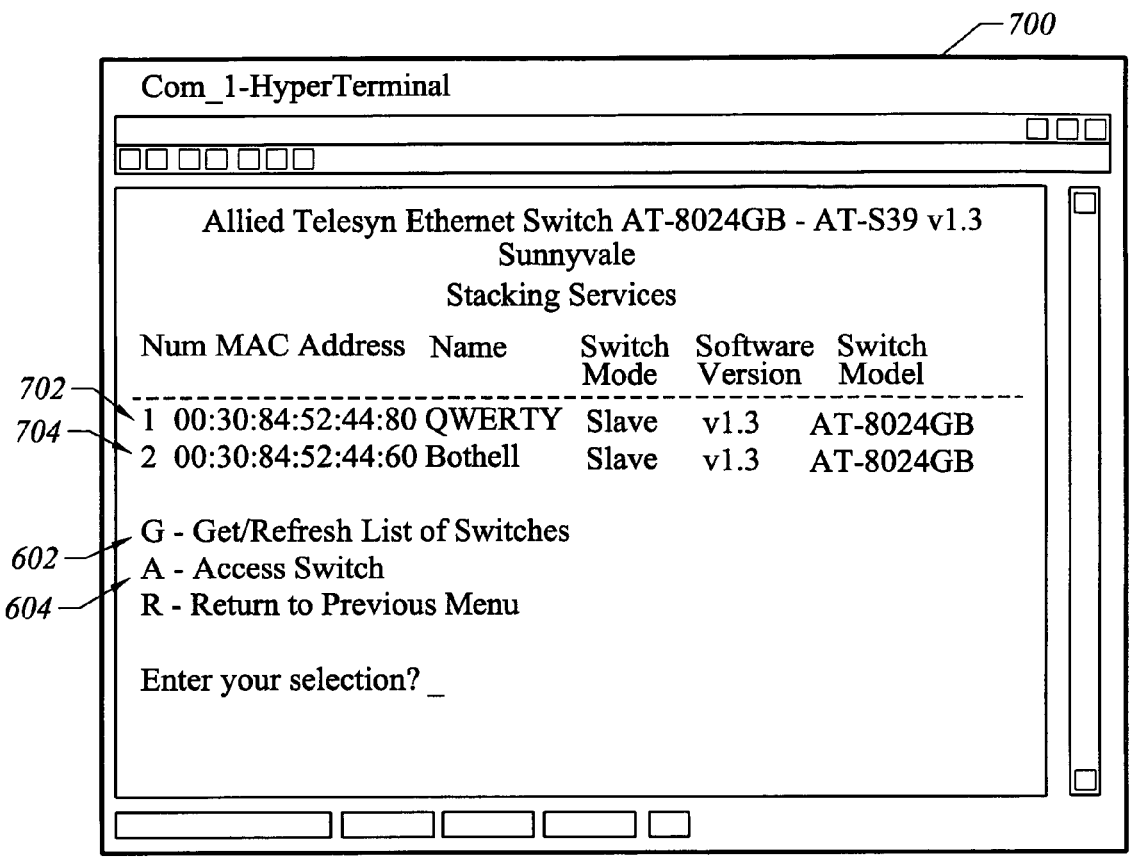
FIG. 7 illustrates a user-interface screen that can be provided in response to a user selecting an option labeled as "Get/Refresh List of Switches" shown in FIG. 6, according to an embodiment of the invention.
Figure 8:
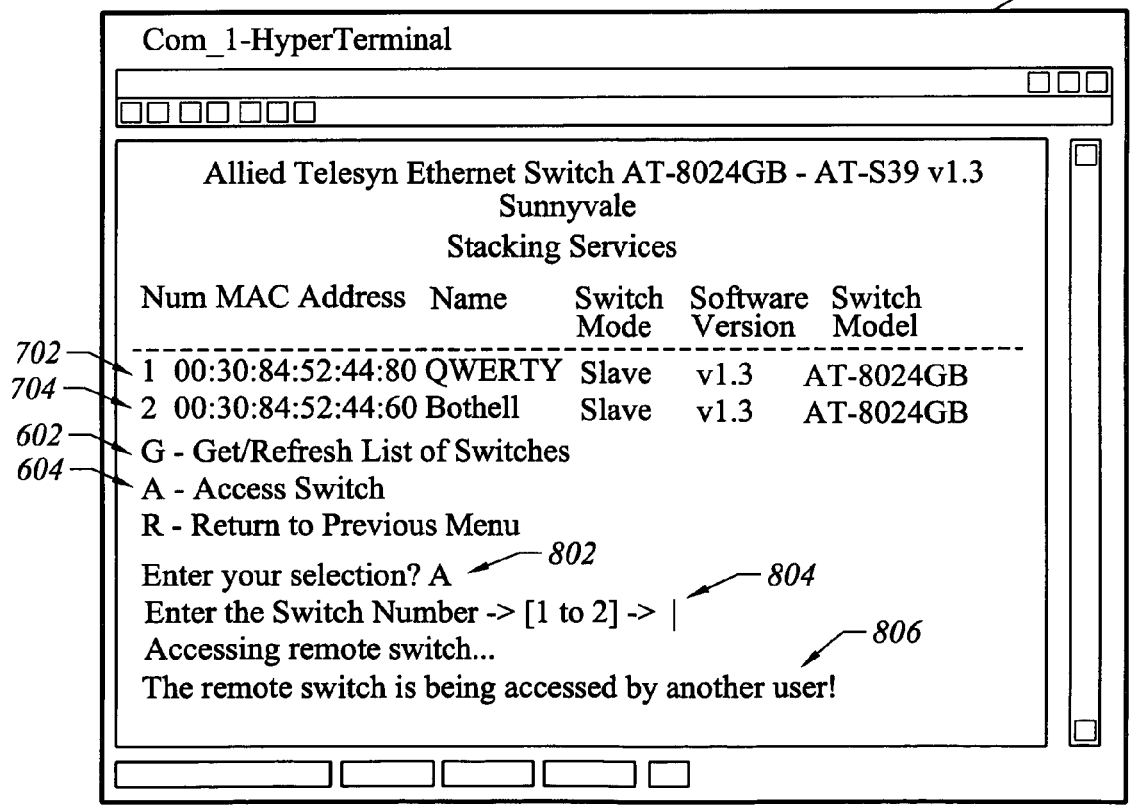
FIG. 8 illustrates a user-interface screen that can be provided in response to a user selecting an option labeled as "Access Switch" shown in FIG. 7, according to an embodiment of the invention.
Figure 9:
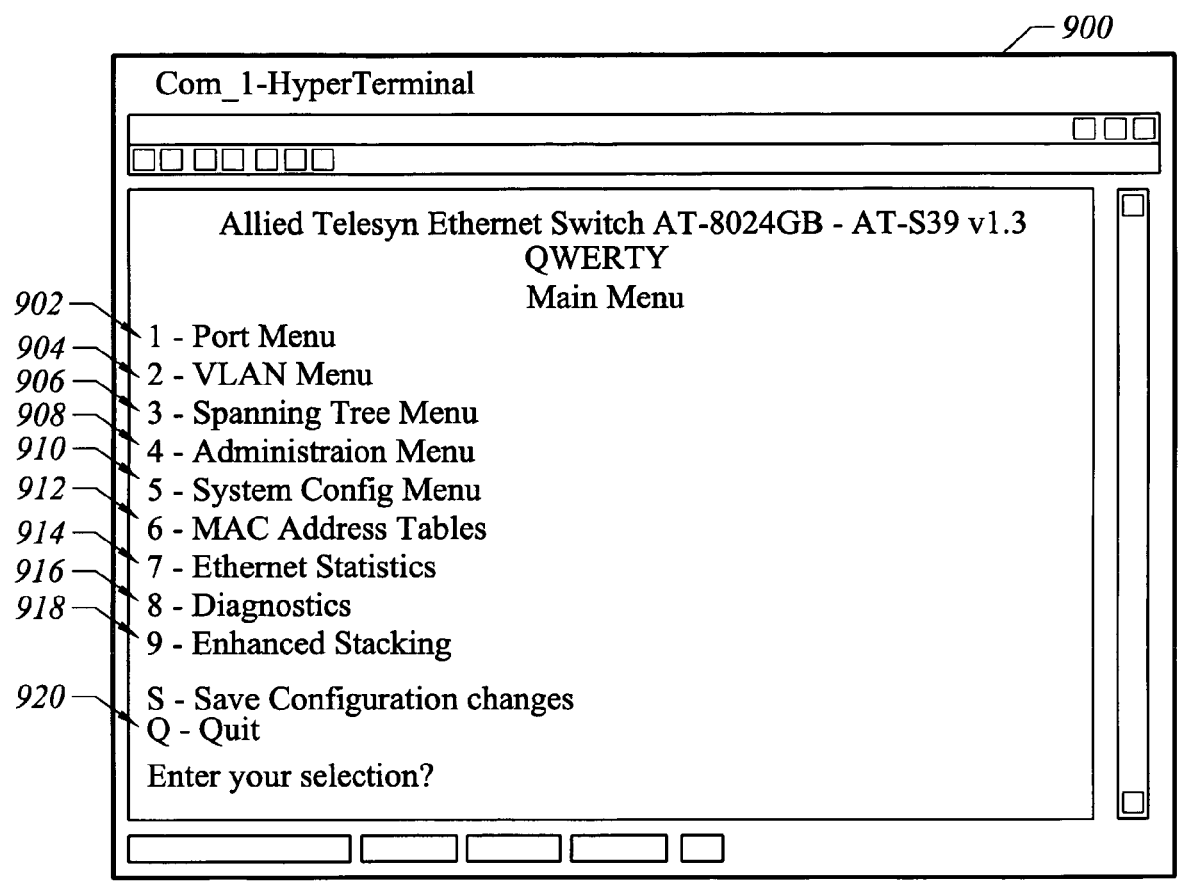
FIG. 9 illustrates another user-interface screen indicating various sub-menus that can be selected to manage a set of switches, according to an embodiment of the invention.

Turning next to FIG. 3 through FIG. 9, various examples of user-interface screens that can be provided to manage a set of switches are shown, according to an embodiment of the invention. In particular, FIG. 3 through FIG. 9 illustrate user-interface screens that can be displayed by a user-interface module (e.g., the user-interface module 116A) of a first switch (e.g., the switch 102A) to manage the set of switches. By way of overview, FIG. 3 through FIG. 8 illustrate user-interface screens associated with the first switch, while FIG. 9 illustrates a user-interface screen associated with another switch (e.g., the switch 102B or 102C) that is managed using the first switch.

Figure 3:
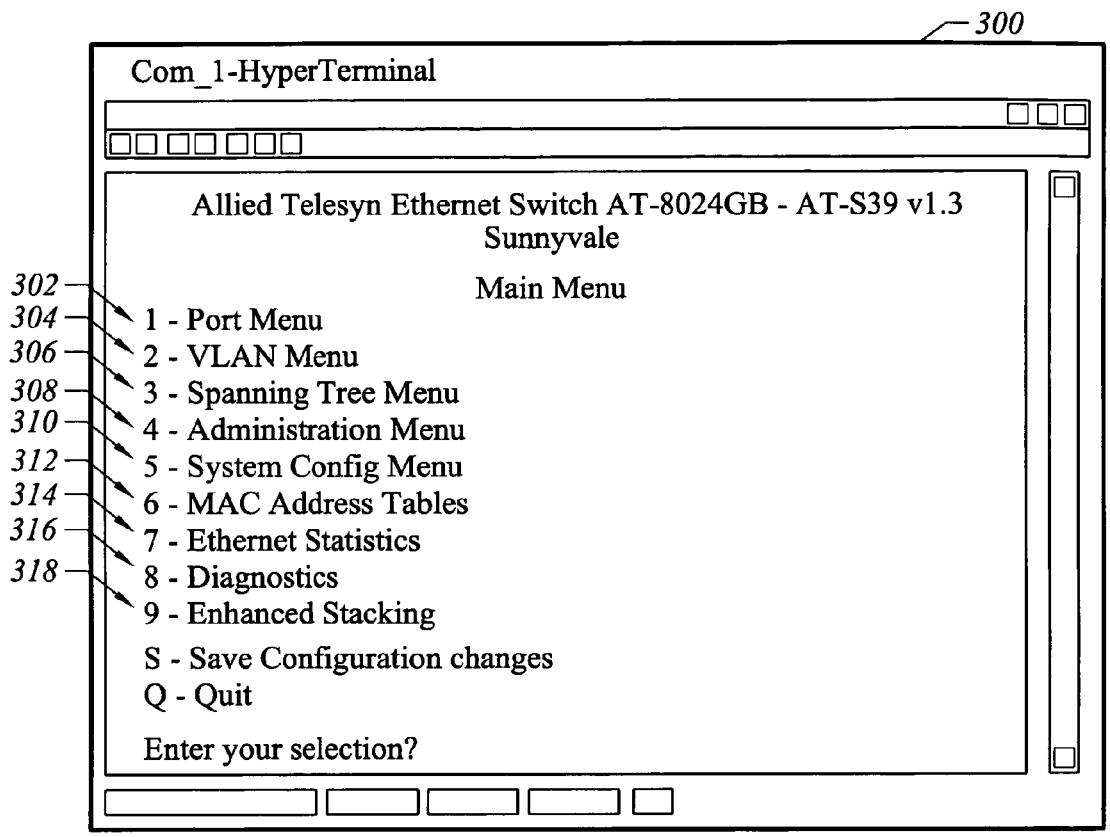
FIG. 3 illustrates a user-interface screen indicating various sub-menus that can be selected to manage a set of switches, according to an embodiment of the invention.

FIG. 3 illustrates a user-interface screen 300 indicating various sub-menus 302, 304, 306, 308, 310, 312, 314, 316, and 318 that can be selected to manage the set of switches. In the present example, selecting one or more of the sub-menus 302, 304, 306, 308, 310, 312, 314, and 316 allows a user to view or modify a variety of operational parameters associated with the first switch (here, named "Sunnyvale"), while selecting the sub-menu 318 allows the user to view or modify a variety of operational parameters associated with another switch of the set of switches. For security purposes, a user may be prompted to enter an access password for the first switch before the user-interface screen 300 is displayed or before one or more of the sub-menus 302, 304, 306, 308, 310, 312, 314, 316, and 318 can be selected.

With reference to FIG. 3, the sub-menu 302 labeled as "Port Menu" can be selected to view or modify a variety of operational parameters associated with one or more ports of the first switch. For example, selecting the sub-menu 302 allows a user to view or modify a status of a link between a port and a network device connected to the port, an operating speed of a port (e.g., 10 Mbps, 100 Mbps, or 1000 Mbps), a duplex mode of a port (e.g., half-duplex or full-duplex), an auto-negotiation setting of a port (e.g., enabled or disabled), a flow control setting of a port (e.g., no flow control or flow control for data frames that are transmitted, received, or both), an operating status of a port (e.g., enabled or disabled), a security setting of a port (e.g., dynamic Media Access Control ("MAC") address table enabled, disabled, or restricted), and so forth. In addition, selecting the sub-menu 302 allows the user to view or modify a variety of operational parameters associated with configuring port trunks and port mirroring.

In the present example, the sub-menu 304 labeled as "VLAN Menu" can be selected to view or modify a variety of operational parameters associated with configuring a Virtual Local Area Network ("VLAN"). For instance, selecting the sub-menu 304 allows a user to configure one or more ports of the first switch as a VLAN. In the present example, one or more ports of the first switch can be configured to form a port-based VLAN or a tagged VLAN.

The sub-menu 306 labeled as "Spanning Tree Menu" can be selected to view or modify a variety of operational parameters to direct switching operations performed by the first switch using Spanning Tree Protocol ("STP"). For instance, selecting the sub-menu 306 allows a user to view or modify a variety of STP parameters for one or more ports of the first switch (e.g., path costs, port priorities, bridge hello times, and root bridges).

With reference to FIG. 3, the sub-menu 308 labeled as "Administration Menu" can be selected to view or modify a variety of operational parameters to direct switching operations performed by the first switch using IP. For instance, the sub-menu 308 can be selected to view or modify a variety of IP configuration parameters, such as an IP address of the first switch, a subnet mask of the first switch, an IP address of a gateway (e.g., a router) connected to the first switch, and so forth. In addition, the sub-menu 308 can be selected to view or modify the name for the first switch or the access password for the first switch.

The sub-menu 310 labeled as "System Config Menu" can be selected to activate a Bootstrap Protocol ("BOOTP") program or a Dynamic Host Configuration Protocol ("DHCP") program to automatically assign one or more IP configuration parameters to the first switch. In addition, the sub-menu 310 can be selected to view or modify additional operational parameters such as, for example, security settings for access to the first switch (e.g., a timeout period or web access to the first switch enabled, disabled, or restricted), Internet Group Management Protocol ("IGMP") snooping configuration settings, broadcast frame control settings, SNMP configuration settings, and so forth.

The sub-menu 312 labeled as "MAC Address Tables" can be selected to view or modify a variety of operational parameters associated with dynamic and static MAC addresses that can be stored by the first switch. For instance, selecting the sub-menu 312 allows a user to view or modify dynamic and static MAC address tables, an aging time for dynamic MAC addresses, and so forth.

With reference to FIG. 3, the sub-menu 314 labeled as "Ethernet Statistics" can be selected to view a variety of operational parameters that correspond to Ethernet statistics for one or more ports of the first switch. For instance, selecting the sub-menu 314 allows a user to view the number of bytes received or transmitted by a port, the number of times the capacity of a port's buffer has been exceeded, the number of broadcast or multicast data frames received by a port, the number of data frames received by a port that contained a Cyclic Redundancy Check ("CRC") error, the number of undersized, fragmented, or oversized data frames received by a port, and so forth.

In the present example, the sub-menu 316 labeled as "Diagnostics" can be selected to view a MAC address of the first switch, a software version of an operational module or a management module of the first switch, a model or serial number of the first switch, and so forth.

And, the sub-menu 318 labeled as "Enhanced Stacking" can be selected to manage another switch of the set of switches. In the present example, the sub-menu 318 is selected by, for example, a mouse click or a keyboard selection.

Figure 4:
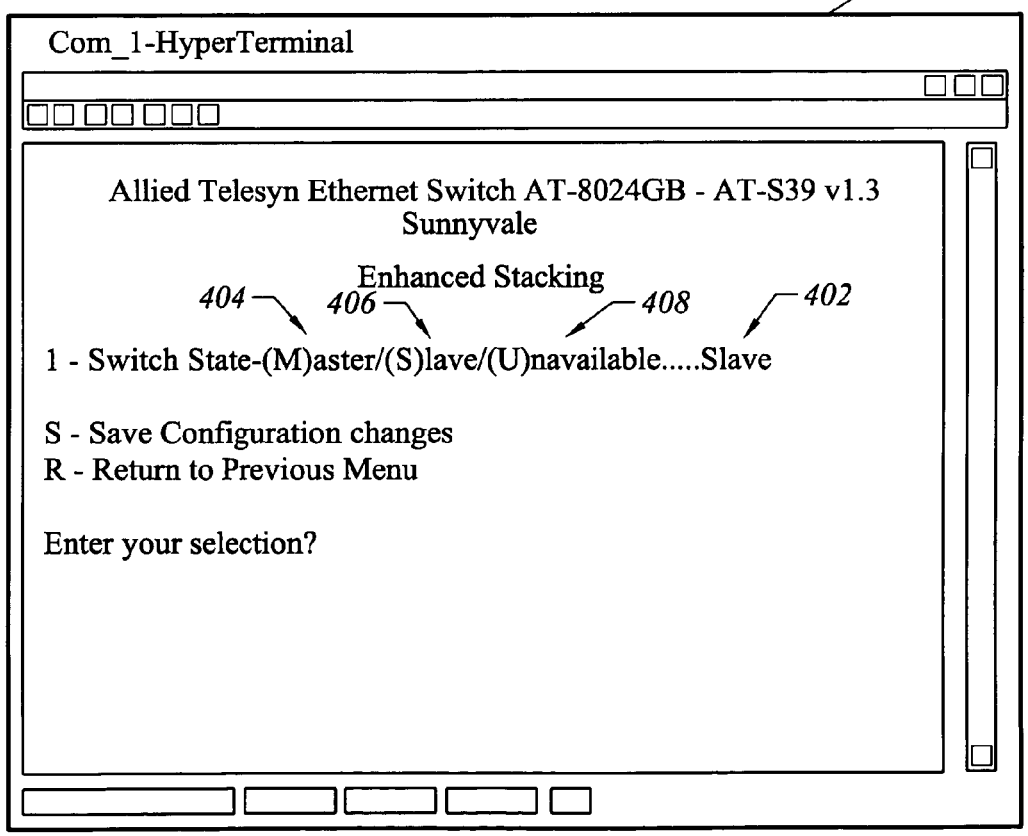
FIG. 4 illustrates a user-interface screen that can be provided in response to a user selecting a sub-menu labeled as "Enhanced Stacking" shown in FIG. 3, according to an embodiment of the invention.

FIG. 4 illustrates a user-interface screen 400 that can be provided in response to a user selecting the sub-menu 318 shown in FIG. 3. As shown in FIG. 4, the user-interface screen 400 indicates the first switch to be configured as a slave switch via the indication "Slave" 402. The user-interface screen 400 indicates that three switch states are defined for the first switch, including a master switch state, a slave switch state, and an unavailable switch state as shown by the indications "(M)aster" 404, "(S)lave" 406, and "(U)navailable" 408. The user can select a particular switch state by, for example, a mouse click or keyboard selection. In the present example, the master switch state is selected by the user, and, in response, the first switch is configured as a first master switch.

Figure 5:
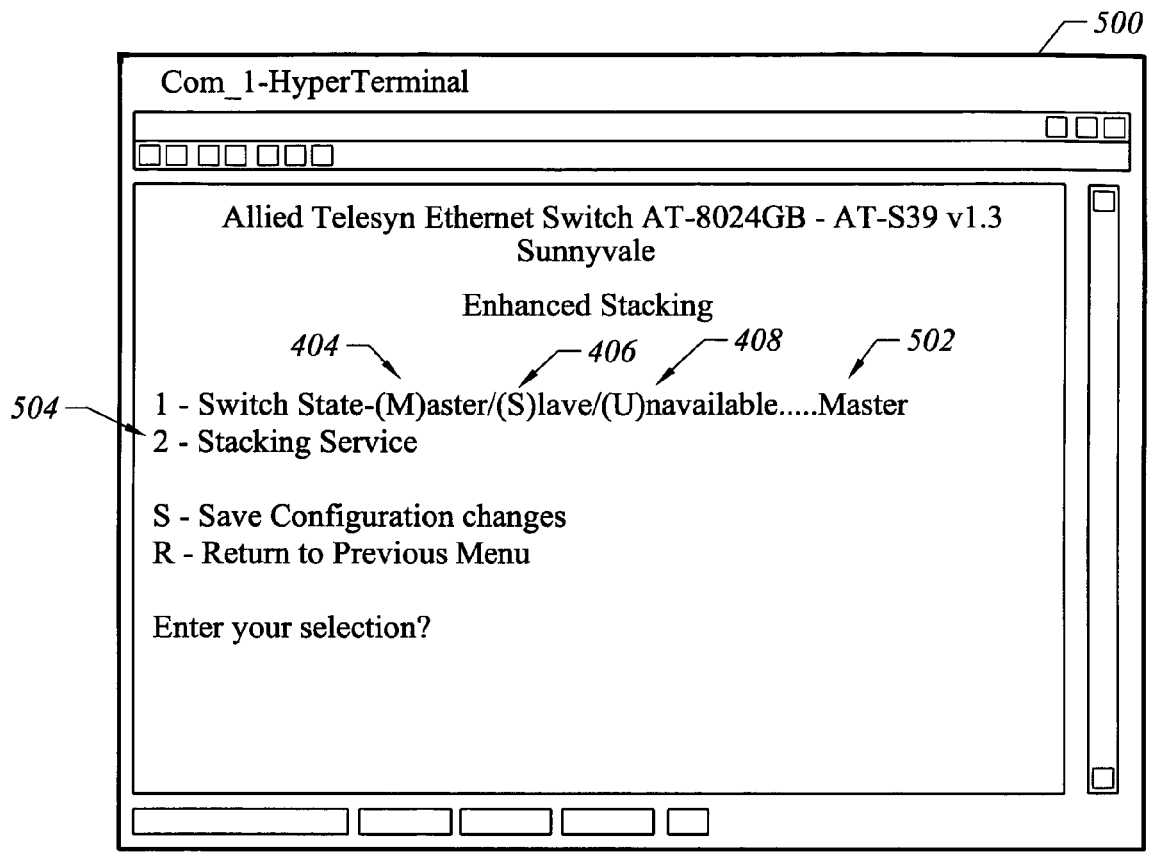
FIG. 5 illustrates a user-interface screen that can be provided once a switch is configured as a master switch in accordance with an embodiment of the invention.

Turning next to FIG. 5, a user-interface screen 500 is shown that can be provided once the first switch is configured as the first master switch. In particular, the user-interface screen 500 indicates the first switch to be configured as the first master switch via the indication "Master" 502. As shown in FIG. 5, the user-interface screen 500 indicates a sub-menu 504 labeled as "Stacking Services", which can be selected by, for example, a mouse click or keyboard selection to manage another switch that is connected to the first master switch.

Figure 6:
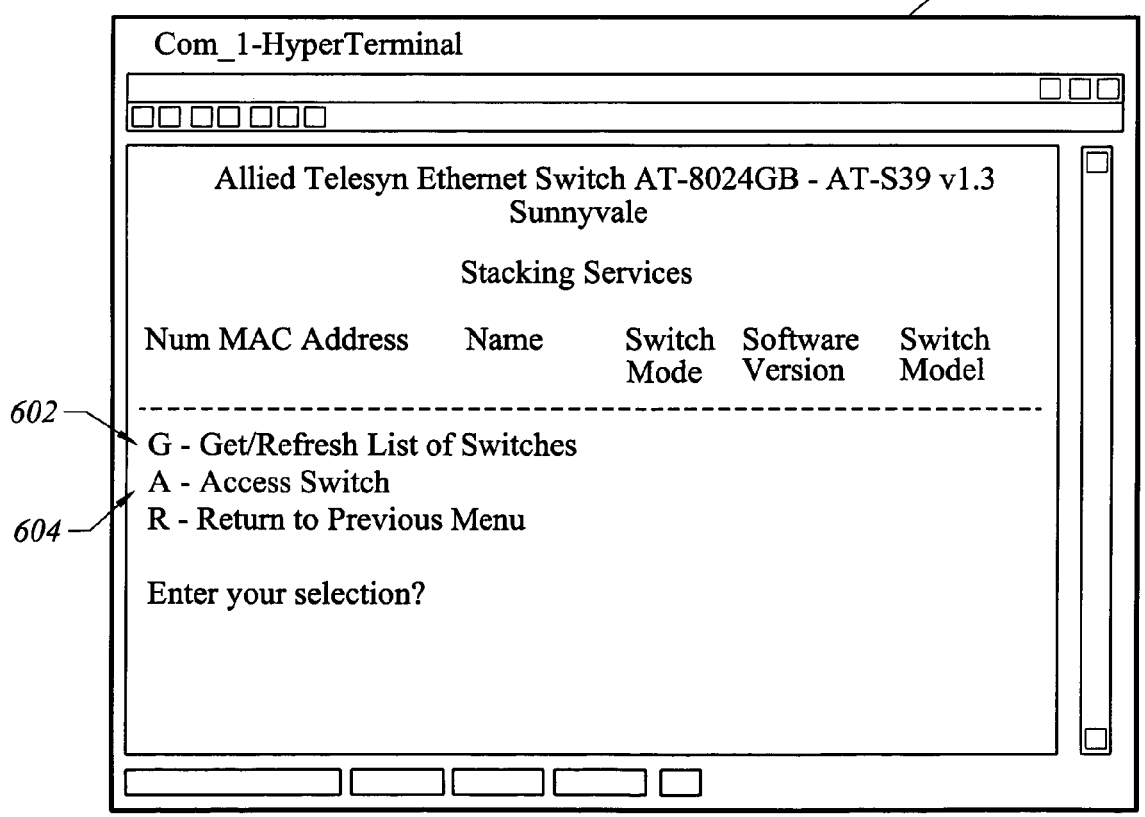
FIG. 6 illustrates a user-interface screen that can be provided in response to a user selecting a sub-menu labeled as "Stacking Services" shown in FIG. 5, according to an embodiment of the invention.

FIG. 6 illustrates a user-interface screen 600 that can be provided in response to a user selecting the sub-menu 504 shown in FIG. 5. As shown in FIG. 6, two options 602 and 604 labeled as "Get/Refresh List of Switches" and "Access Switch", respectively, are indicated. The option 602 can be selected to identify one or more switches of the set of switches, and the option 604 can be selected to determine accessibility of a switch that is identified using the option 602. In the present example, the option 602 is selected by, for example, a mouse click or keyboard selection.

FIG. 7 illustrates a user-interface screen 700 that can be provided in response to a user selecting the option 602 shown in FIG. 6. With reference to FIG. 7, the user-interface screen 700 indicates that a second switch and a third switch (here, named "QWERTY" and "Bothell", respectively) have been identified via the indications 702 and 704. The user-interface screen 700 also indicates a variety of information associated with the identified switches, including MAC addresses, switch states, software versions, and model numbers of the identified switches. In the present example, both of the identified switches are configured as slave switches. Accessibility of one of the identified switches can be determined by selecting the option 604 via, for example, a mouse click or keyboard selection.

FIG. 8 illustrates a user-interface screen 800 that can be provided in response to a user selecting the option 604 shown in FIG. 7. Selection of the option 604 is shown via the indication 802. In the present example, the second switch (here, named "QWERTY") is selected as shown via the indication 804. With reference to FIG. 8, the second switch is determined to be inaccessible since it is being accessed by another user, as shown via the indication 806.

Turning next to FIG. 9, a user-interface screen 900 is shown that can be provided once the second switch is determined to be accessible. In the present example, the user-interface screen 900 is associated with the second switch and has a configuration that is similar to that of the user-interface screen 300 shown in FIG. 3. It should be recognized that the user-interface screen 900 can be displayed by the user-interface module of the first master switch to allow a user to manage the second switch using the first master switch.

As shown in FIG. 9, the user-interface screen 900 indicates various sub-menus 902, 904, 906, 908, 910, 912, 914, 916, and 918 that can be selected by the user to manage the second switch. In particular, selecting one or more of the sub-menus 902, 904, 906, 908, 910, 912, 914, and 916 allows the user to view or modify a variety of operational parameters associated with the second switch. For instance, selecting the sub-menu 902 labeled as "Port Menu" allows the user to view or modify a variety of operational parameters associated with one or more ports of the second switch. Also, selecting the sub-menu 908 labeled as "Administration Menu" allows the user to view or modify a variety of operational parameters to direct switching operations performed by the second switch using IP. In particular, selecting the sub-menu 908 allows the user to specify a variety of IP configuration parameters, such as an IP address of the second switch, to provide for access to the second switch using a Telnet application protocol or a web browser. In the present example, one or more options or sub-menus associated with the sub-menu 918 labeled as "Enhanced Stacking" can be disabled to prevent nested management of a switch via multiple master switches. However, for some embodiments of the invention, it is contemplated that the sub-menu 918 can be selected to configure the second switch as a second master switch and thereafter to manage the set of switches using the second master switch. For security purposes, the user may be prompted to enter an access password for the second switch before the user-interface screen 900 is displayed or before one or more of the sub-menus 902, 904, 906, 908, 910, 912, 914, 916, and 918 can be selected. In the present example, the access passwords for the first master switch and the second switch can be different for enhanced security. Once the user has finished managing the second switch, the user can select option 920 labeled as "QUIT" to return to the user-interface screen 700 shown in FIG. 7. If desired, the user can then proceed to manage the third switch (here, named "Bothell") using the first master switch in a similar fashion as discussed for the second switch.

Figure 10:
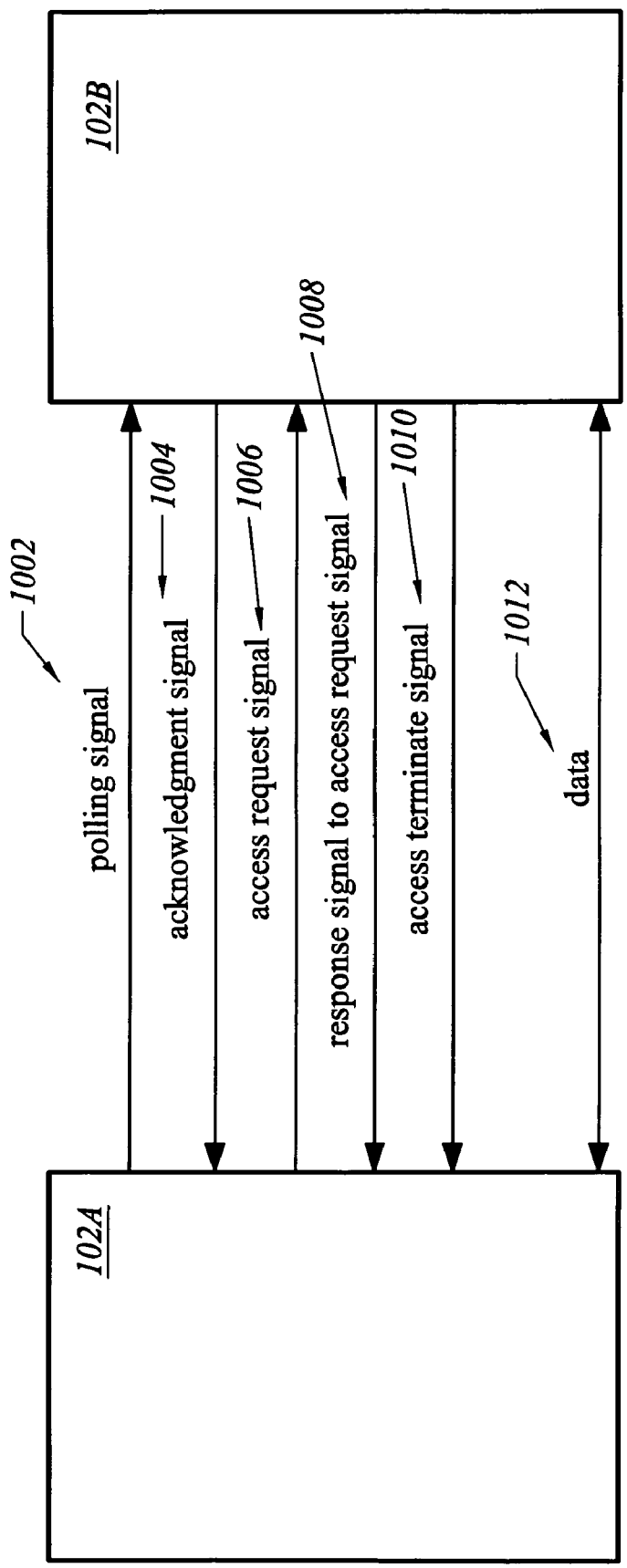
FIG. 10 illustrates various signals transmitted between two switches in accordance with a set of stacking protocols of an embodiment of the invention.

Turning next to FIG. 10, various signals that can be transmitted between two switches (here, the switches 102A and 102B) according to a set of stacking protocols are shown, according to an embodiment of the invention. The set of stacking protocols includes a stacking discovery protocol, a stacking administration protocol, and a stacking services protocol. With reference to FIG. 10, a polling signal 1002 and an acknowledgment signal 1004 can be transmitted in accordance with the stacking discovery protocol. An access request signal 1006, a response signal 1008, and an access terminate signal 1010 can be transmitted in accordance with the stacking administration protocol. And, data 1012 shown in FIG. 10 can be transmitted in accordance with the stacking services protocol. In the present embodiment of the invention, the switch 102A is configured as a master switch and is used to manage the switch 102B, which, in general, can be configured as a master switch, a slave switch, or an unavailable switch.

In accordance with the stacking discovery protocol, a stacking administration module (e.g., the stacking administration module 122A) of the switch 102A directs the switch 102A to transmit the polling signal 1002 to the switch 102B. A polling signal (e.g., the polling signal 1002) is used to identify the presence of one or more switches that are connected to a master switch. If desired, a polling signal also can be used to identify a variety of information associated with a switch that is connected to a master switch, examples of which are discussed below. In the present embodiment of the invention, the polling signal 1002 can be transmitted in response to user input that is received via a user-interface module (e.g., the user-interface module 116A) of the switch 102A. In an alternative embodiment of the invention, the polling signal 1002 may be automatically transmitted in a periodic or non-periodic fashion.

The switch 102B receives the polling signal 1002 and, in accordance with the stacking discovery protocol, a stacking administration module (e.g., the stacking administration module 122B) of the switch 102B directs the switch 102B to respond to the polling signal 1002 by transmitting the acknowledgment signal 1004 to the switch 102A. An acknowledgment signal (e.g., the acknowledgment signal 1004) is used to indicate the presence of a switch that is connected to a master switch. If desired, an acknowledgment signal also can be used to indicate a variety of information associated with a switch that is connected to a master switch, including, for example, a name of the switch, a MAC address of the switch, an IP address of the switch (if any), a switch state associated with the switch, a software version of an operational module or a management module of the switch, a model or serial number of the switch, and so forth. For certain applications, the switch 102B will respond to the polling signal 1002 if the switch 102B is configured as any one of a master switch, a slave switch, or an unavailable switch. Alternatively, the switch 102B need not respond to the polling signal 1002 if configured as an unavailable switch.

As shown in FIG. 10, the switch 102A receives the acknowledgment signal 1004 from the switch 102B. As discussed previously, the acknowledgment signal 1004 can indicate a variety of information associated with the switch 102B, and such information can be displayed to a user via the user-interface module 116A.

Next, in accordance with the stacking administration protocol, the stacking administration module 122A directs the switch 102A to transmit the access request signal 1006 to the switch 102B. An access request signal (e.g., the access request signal 1006) is used to determine whether a switch is accessible for management by a master switch. In the present embodiment of the invention, the access request signal 1006 can be transmitted in response to user input that is received via the user-interface module 116A. For instance, the switch 102A can receive several acknowledgment signals to identify several switches as being connected to the switch 102A, and the stacking administration module 122A can receive, via the user-interface module 116A, a user-specified selection of the switch 102B. In an alternative embodiment of the invention, the access request signal 1006 may be automatically transmitted by the switch 102A after receiving the acknowledgment signal 1004. In another alternative embodiment of the invention, the acknowledgment signal 1004 may indicate whether the switch 102B is accessible for management by the switch 102A, in which case the access request signal 1006 need not be transmitted.

With reference to FIG. 10, the switch 102B receives the access request signal 1006 and, in accordance with the stacking administration protocol, the stacking administration module 122B directs the switch 102B to respond to the access request signal 1006 by transmitting the response signal 1008 to the switch 102A. In the present embodiment of the invention, various types of response signals can be transmitted in response to the access request signal 1006, including an access response signal, an access error signal, an access switch-in-use signal, and an access switch-not-accessible signal. An access response signal is used to indicate that a switch is accessible for management by a master switch. On the other hand, an access error signal, an access switch-in-use signal, and an access switch-not-accessible signal are used to indicate that a switch is not accessible for management by a master switch for different reasons. In particular, an access error signal is used to indicate an error in processing an access request signal from a master switch, an access switch-in-use signal is used to indicate that a switch is being managed by another user, and an access switch-not-accessible signal is used to indicate that a switch is not configured to be managed by a master switch (e.g., configured as an unavailable switch). In the present embodiment of the invention, the switch 102B is accessible for management by the switch 102A and transmits the response signal 1008 that corresponds to an access response signal.

As shown in FIG. 10, the switch 102A receives the response signal 1008 and is thereafter used to manage the switch 102B. In particular, in accordance with the stacking services protocol, a stacking services module (e.g., the stacking services module 124A) of the switch 102A directs the switch 102A to receive or transmit data 1012 to allow the switch 102B to be managed using the switch 102A. Data 1012 can include, for example, data associated with one or more operational parameters of the switch 102B. In a complementary fashion, a stacking services module (e.g., the stacking services module 124B) of the switch 102B directs the switch 102B to transmit or receive data 1012. Data 1012 can be received by the switch 102A and displayed to a user via the user-interface module 116A, and data 1012 can be transmitted by the switch 102A in response to user input that is received via the user-interface module 116A. In this manner, the user can view or modify a variety of operational parameters associated with the switch 102B using the switch 102A.

In the present embodiment of the invention, the stacking administration module 122B of the switch 102B directs the switch 102B to transmit the access terminate signal 1010 in accordance with the stacking administration protocol. An access terminate signal (e.g., the access terminate signal 1010) is used to indicate that access to a switch for management by a master switch is terminated. If desired, an access terminate signal also can be used to prompt a master switch to initiate a cleanup routine. In the present embodiment of the invention, the access terminate signal 1010 can be transmitted in response to user input that is received via the user-interface module 116A and transmitted to the switch 102B (e.g., incorporated in data 1012). For instance, the access terminate signal 1010 can be transmitted in response to user input to terminate management of the switch 102B. Alternatively, or in conjunction, the access terminate signal 1010 can be transmitted by the switch 102B due to inactivity or lost connection to the switch 102A.

Figure 11:
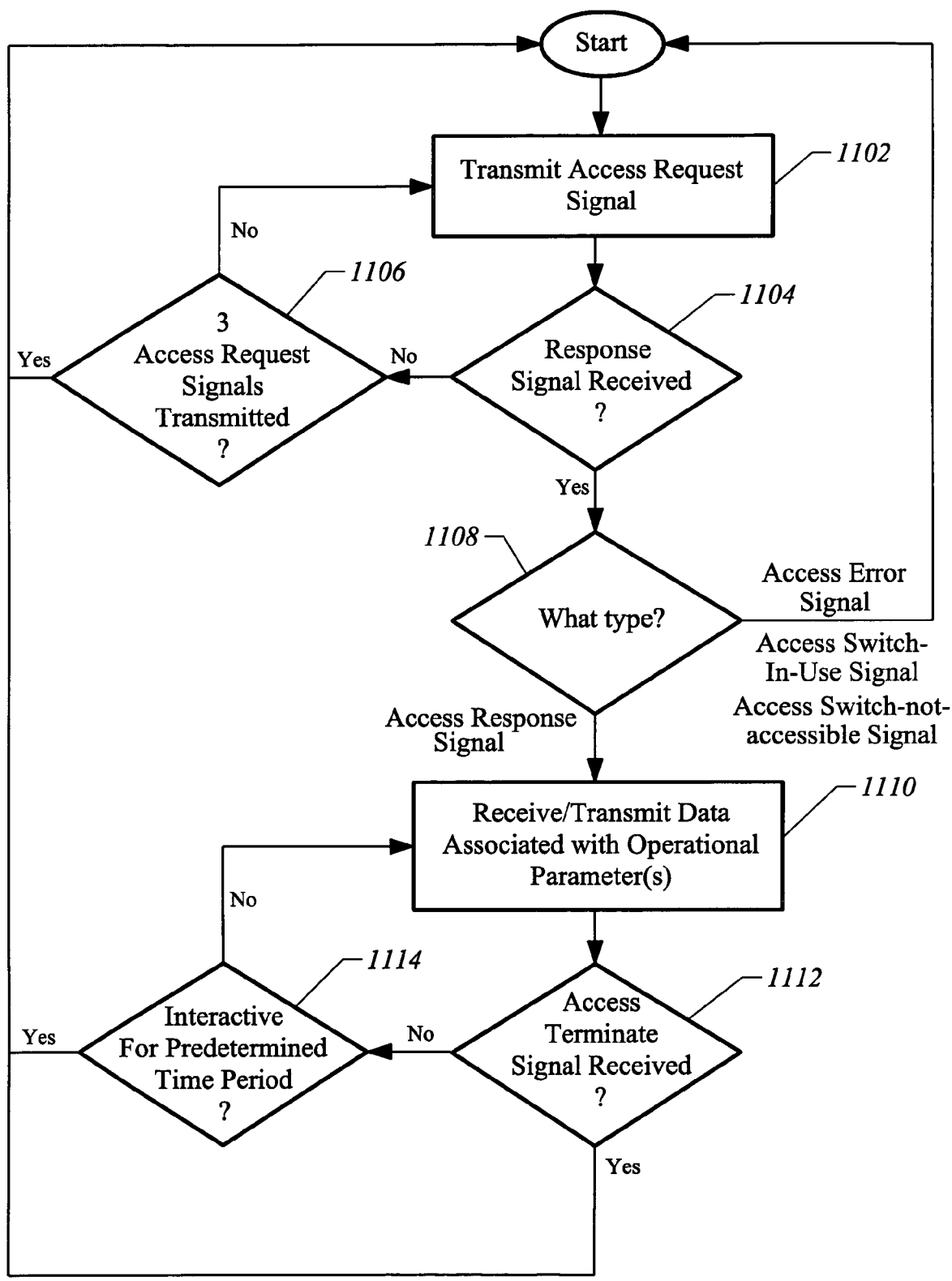
FIG. 11 illustrates processing steps that can be performed by a master switch to manage another switch in accordance with an embodiment of the invention.

Attention next turns to FIG. 11, which illustrates processing steps that can be performed by a master switch (e.g., the switch 102A) to manage another switch (e.g., the switch 102B or 102C), in accordance with an embodiment of the invention. More particularly, FIG. 11 illustrates processing steps that can be performed by the master switch in accordance with a set of stacking protocols. For ease of discussion, the switch that is managed by the master switch is referred to below as a slave switch, although it should be recognized that a master switch (e.g., a second master switch) also can be managed according to the present embodiment of the invention.

With reference to FIG. 11, the master switch transmits an access request signal to determine accessibility of the slave switch for management by the master switch (step 1102). In the present embodiment of the invention, the slave switch may have been previously identified by the master switch in accordance with a stacking discovery protocol. The master switch determines whether a response signal is received from the slave switch (step 1104). If a response signal is not received, the master switch can transmit one or more additional access request signals. In the present embodiment of the invention, the master switch determines whether three access request signals have already been transmitted (step 1106). If less than three access request signals have been transmitted, the master switch will transmit an additional access request signal. On the other hand, if a response signal is not received after three access request signals have been transmitted, the master switch in the present embodiment of the invention will not transmit an additional access request signal and will proceed back to a start configuration. In an alternative embodiment of the invention, the master switch may skip step 1106 and may proceed back to the start configuration if a response signal is not received in accordance with step 1104. The master switch may perform cleanup activities prior to proceeding back to the start configuration.

If a response signal is received in accordance with step 1104, the master switch determines the type of response signal that is received (step 1108). If the master switch determines that an access error signal, an access switch-in-use signal, or an access switch-not-accessible signal is received, the master switch will proceed back to the start configuration. In an alternative embodiment of the invention, the master switch may transmit one or more additional access request signals if an access error signal, an access switch-in-use signal, or an access switch-not-accessible signal is received. On the other hand, as shown in FIG. 11, once the master switch determines that an access response signal is received in accordance with step 1108, the master switch can proceed to receive or transmit data to manage the slave switch, including, for example, data associated with one or more operational parameters of the slave switch (step 1110).

As shown in FIG. 11, the master switch determines whether an access terminate signal is received from the slave switch (step 1112). If an access terminate signal is not received, the master switch in the present embodiment of the invention determines whether there has been inactivity for a predetermined time period (e.g., a timeout period) (step 1114). The master switch can establish inactivity using a variety of criteria, such as, for example, lack of user input for the predetermined time period or lack of data being transmitted between the master switch and the slave switch for the predetermined time period. If inactivity is determined in accordance with step 1114, the master switch will proceed back to the start configuration. Otherwise, the master switch will continue to receive or transmit data in accordance with step 1110.

Figure 12:
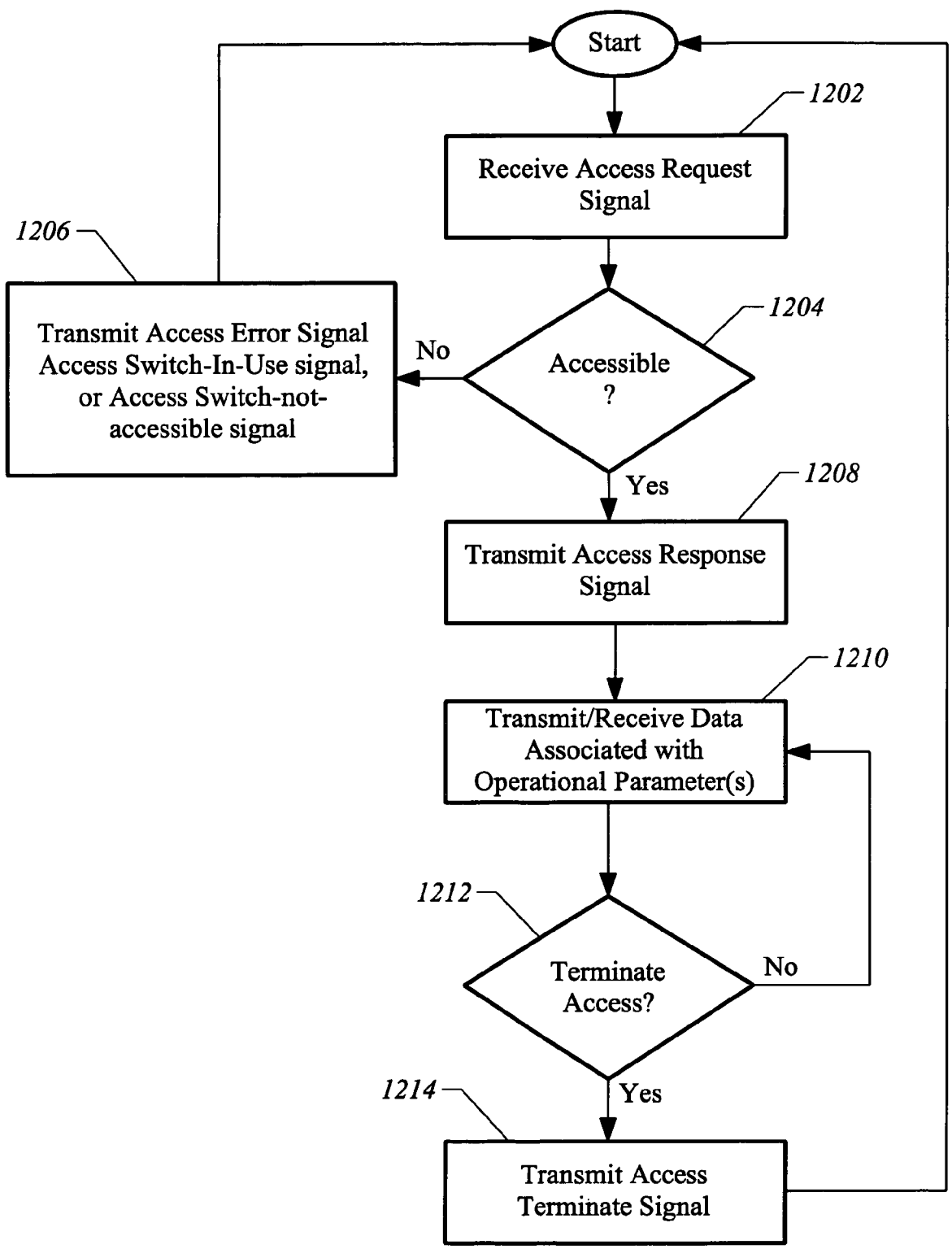
FIG. 12 illustrates processing steps that can be performed by a switch that is managed by a master switch in accordance with an embodiment of the invention.

FIG. 12 illustrates processing steps that can be performed by a switch (e.g., the switch 102B or 102C) that is managed by a master switch (e.g., the switch 102A), in accordance with an embodiment of the invention. More particularly, FIG. 12 illustrates processing steps that can be performed by a switch that is managed in accordance with a set of stacking protocols. For ease of discussion, the switch that is managed is referred to below as a slave switch, although it should be recognized that a master switch (e.g., a second master switch) can also be managed according to the present embodiment of the invention.

As shown in FIG. 12, the slave switch receives an access request signal from the master switch (step 1202). In the present embodiment of the invention, the slave switch may have been previously identified by the master switch in accordance with a stacking discovery protocol. The slave switch determines whether it is accessible for management by the master switch (step 1204). If the slave switch determines that it is not accessible in accordance with step 1204, the slave switch transmits an access error signal, an access switch-in-use signal, or an access switch-not-accessible signal (step 1206) and then proceeds back to a start configuration. In an alternative embodiment of the invention, the slave switch may skip step 1206 and may proceed back to the start configuration if the slave switch is not accessible in accordance with step 1204. The slave switch may perform cleanup activities prior to proceeding back to the start configuration.

If the slave switch determines that it is accessible in accordance with step 1204, the slave switch transmits an access response signal to the master switch (step 1208). In the present embodiment of the invention, once the slave switch transmits the access response signal in accordance with step 1208, the slave switch can proceed to transmit or receive data to allow the slave switch to be managed using the master switch, including, for example, data associated with one or more operational parameters of the slave switch (step 1210).

As shown in FIG. 12, the slave switch determines whether access to the slave switch for management by the master switch should be terminated (step 1212). The slave switch can establish that access should be terminated using a variety of criteria, such as, for example, in response to user input to terminate management of the slave switch or inactivity for a predetermined time period. If access to the slave switch should be terminated in accordance with step 1212, the slave switch transmits an access terminate signal (step 1214) and then proceeds back to the start configuration. Otherwise, the slave switch will continue to transmit or receive data in accordance with step 1210.

Figure 13:
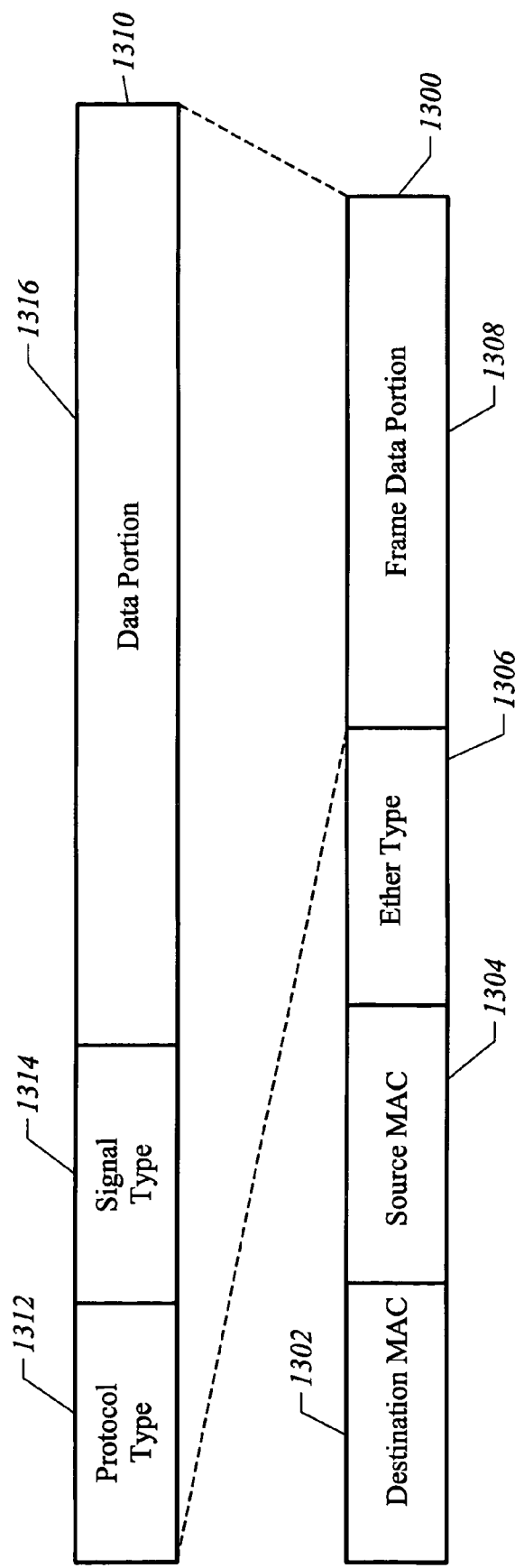
FIG. 13 illustrates a data frame that can be generated in accordance with a stacking discovery protocol, according to an embodiment of the invention.

FIG. 13 illustrates a data frame 1300 that can be generated in accordance with a stacking discovery protocol of an embodiment of the invention. As shown in FIG. 13, the data frame 1300 represents an OSI Layer 2 data frame, which in the present embodiment corresponds to an Ethernet frame. The data frame 1300 includes four portions: a destination MAC address portion 1302, a source MAC address portion 1304, an ether type portion 1306, and a frame data portion 1308. The destination MAC address portion 1302 typically indicates a MAC address of a particular switch to which the data frame 1300 is transmitted. Alternatively, the destination MAC address portion 1302 can indicate a general broadcast address or a limited broadcast address. The source MAC address portion 1304 typically indicates a MAC address of a switch that transmits the data frame 1300. The ether type portion 1306 typically indicates an Ethernet type associated with the data frame 1300 (e.g., 8158 (ATI Ether Type)).

As shown in FIG. 13, the frame data portion 1308 incorporates a data packet 1310, which in the present embodiment corresponds to a polling signal or an acknowledgment signal as specified by the stacking discovery protocol. The data packet 1310 in the present embodiment represents an OSI Layer 3 data packet. As shown in FIG. 13, the data packet 1310 includes three portions: a protocol type portion 1312, a signal type portion 1314, and a data portion 1316. The stacking discovery protocol can specify the content, structure, or duration of one or more portions of the data packet 1310 based on whether the data packet 1310 corresponds to a polling signal or an acknowledgment signal. In the present embodiment of the invention, the protocol type portion 1312 indicates the type of stacking protocol associated with the data packet 1310 and allows a switch that receives the data packet 1310 to determine which stacking protocol should be used to process the data packet 1310. For instance, the protocol type portion 1312 for a polling signal can indicate the stacking discovery protocol, and a receiving switch can determine, based on the protocol type portion 1312, that the stacking discovery protocol should be used to process the data packet 1310. The signal type portion 1314 indicates the data packet 1310 as corresponding to a polling signal or an acknowledgment signal. The data portion 1316 can indicate a variety of information associated with a switch that transmits the data frame 1300, including, for example, a name of the switch, a MAC address of the switch, an IP address of the switch (if any), a switch state associated with the switch, a software version of an operational module or a management module of the switch, a model or serial number of the switch, and so forth. In the present embodiment of the invention, the data portion 1316 for a polling signal need not indicate such information and can instead indicate an empty or null message.

While not shown in FIG. 13, it should be recognized that the data frame 1300 may also include a preamble (e.g., corresponding to an alternating sequence of 0's and 1's) for synchronization purposes, an error detection portion (e.g., corresponding to a parity check code, a checksum, or a CRC) for error detection purposes, or both.

Figure 14:
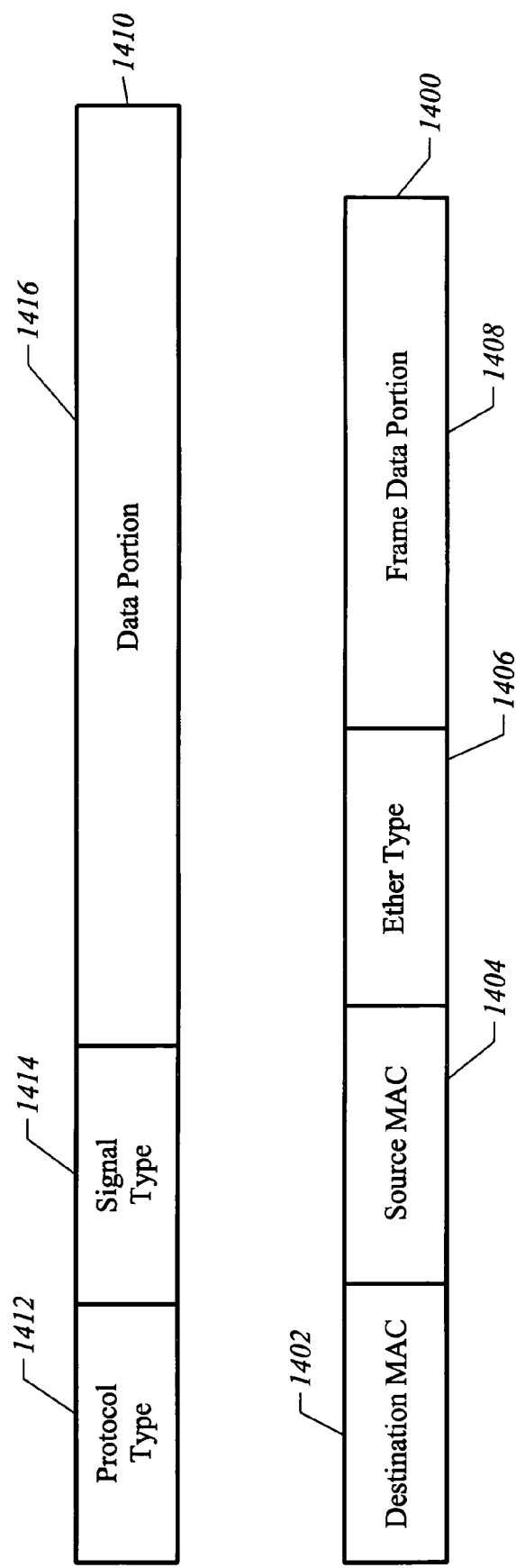
FIG. 14 illustrates a data frame that can be generated in accordance with a stacking administration protocol, according to an embodiment of the invention.

FIG. 14 illustrates a data frame 1400 that can be generated in accordance with a stacking administration protocol of an embodiment of the invention. In the present embodiment of the invention, the data frame 1400 has a configuration that is similar to that of the data frame 1300 shown in FIG. 13. In particular, the data frame 1400 represents an OSI Layer 2 data frame, which in the present embodiment corresponds to an Ethernet frame. The data frame 1400 includes four portions: a destination MAC address portion 1402, a source MAC address portion 1404, an ether type portion 1406, and a frame data portion 1408. While not shown in FIG. 14, it should be recognized that the data frame 1400 may also include a preamble, an error detection portion, or both.

As shown in FIG. 14, the frame data portion 1408 incorporates a data packet 1410, which in the present embodiment corresponds to an access request signal, an access response signal, an access error signal, an access switch-in-use signal, an access switch-not-accessible signal, or an access terminate signal as specified by the stacking administration protocol. The data packet 1410 in the present embodiment represents an OSI Layer 3 data packet. As shown in FIG. 14, the data packet 1410 includes three portions: a protocol type portion 1412, a signal type portion 1414, and a data portion 1416. The stacking administration protocol can specify the content, structure, or duration of one or more portions of the data packet 1410 based on whether the data packet 1410 corresponds to an access request signal, an access response signal, an access error signal, an access switch-in-use signal, an access switch-not-accessible signal, or an access terminate signal. In the present embodiment of the invention, the protocol type portion 1412 indicates the type of stacking protocol associated with the data packet 1410 and allows a switch that receives the data packet 1410 to determine which stacking protocol should be used to process the data packet 1410. For instance, the protocol type portion 1412 for an access request signal can indicate the stacking administration protocol, and a receiving switch can determine, based on the protocol type portion 1412, that the stacking administration protocol should be used to process the data packet 1410. For some embodiments of the invention, the stacking administration protocol can include the stacking discovery protocol as discussed in connection with FIG. 13, and the protocol type portions 1312 and 1412 for the data frames 1300 and 1400 can be the same. With reference to FIG. 14, the signal type portion 1414 indicates the data packet 1410 as corresponding to an access request signal, an access response signal, an access error signal, an access switch-in-use signal, an access switch-not-accessible signal, or an access terminate signal. In the present embodiment of the invention, the data portion 1416 can indicate an empty or null message. In an alternative embodiment of the invention, the data portion 1416 can indicate a variety of information, such as, for example, information associated with a switch that transmits the data frame 1400.

Figure 15:
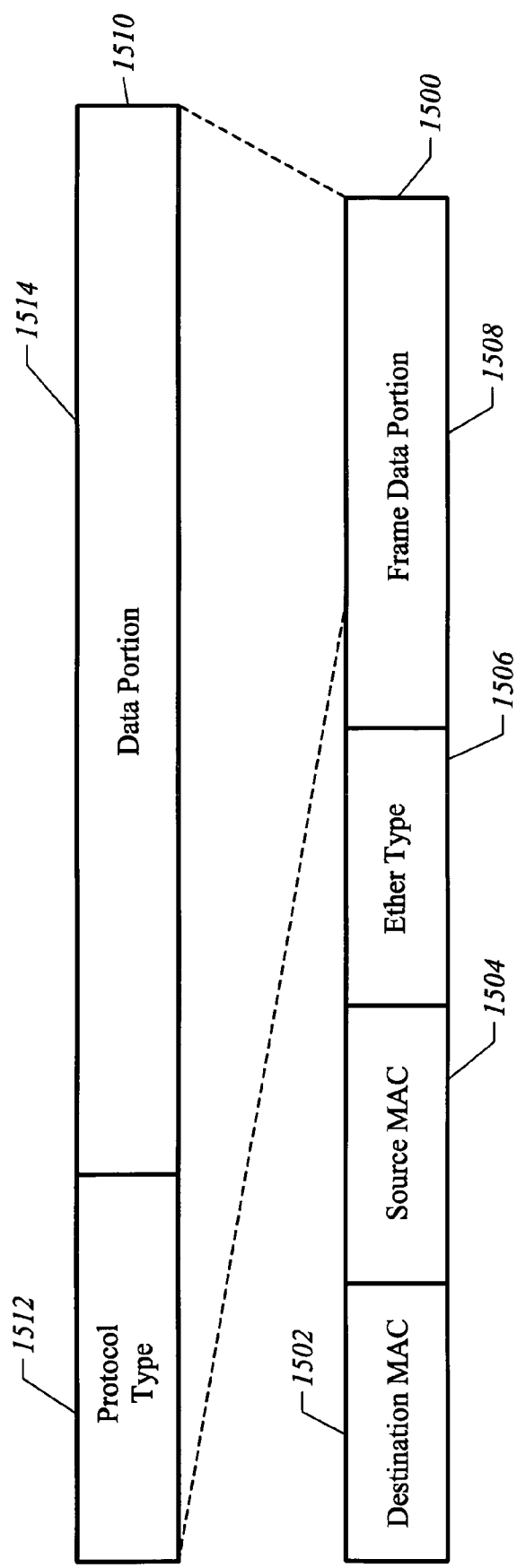
FIG. 15 illustrates a data frame that can be generated in accordance with a stacking services protocol, according to an embodiment of the invention.

With reference to FIG. 15, a data frame 1500 is illustrated that can be generated in accordance with a stacking services protocol of an embodiment of the invention. As shown in FIG. 15, the data frame 1500 represents an OSI Layer 2 data frame, which in the present embodiment corresponds to an Ethernet frame. The data frame 1500 includes four portions: a destination MAC address portion 1502, a source MAC address portion 1504, an ether type portion 1506, and a frame data portion 1508. The destination MAC address portion 1502, the source MAC address portion 1504, and the ether type portion 1506 can be configured in a similar fashion as discussed for the data frames 1300 and 1400. While not shown in FIG. 15, it should be recognized that the data frame 1500 may also include a preamble, an error detection portion, or both.

As shown in FIG. 15, the frame data portion 1508 incorporates a data packet 1510, which in the present embodiment represents an OSI Layer 3 data packet. The data packet 1510 includes two portions: a protocol type portion 1512 and a data portion 1514. The stacking services protocol can specify the content, structure, or duration of one or more portions of the data packet 1510. In the present embodiment of the invention, the protocol type portion 1512 indicates the type of stacking protocol associated with the data packet 1510 and allows a switch that receives the data packet 1510 to determine which stacking protocol should be used to process the data packet 1510. For instance, the protocol type portion 1512 can indicate the stacking services protocol, and a receiving switch can determine, based on the protocol type portion 1512, that the stacking services protocol should be used to process the data packet 1510. The data portion 1514 can include a variety of data to allow a switch to be managed by a master switch, including, for example, data associated with one or more operational parameters of the switch that is managed. For instance, the data frame 1500 can be transmitted to the master switch, and the data portion 1514 can include data associated with an operational parameter in the form of one or more display units to be displayed using the master switch. A display unit can correspond to, for example, a character (e.g., a letter, a number, or a symbol), a string of characters, multiple strings of characters, or a graphical element. As another example, the data frame 1500 can be transmitted from the master switch, and the data portion 1514 can include data associated with an operational parameter that is based on user input received by the master switch. User input can correspond to, for example, a mouse click or a keyboard selection.

At this point, one of ordinary skill in the art will understand advantages associated with various embodiments of the invention. In particular, some embodiments of the invention need not require a dedicated management bus or a dedicated hardware management unit to manage a set of switches. Rather, some embodiments of the invention allow a set of switches to be managed by connecting the switches using conventional network cables (e.g., Ethernet cables). Also, some embodiments of the invention provide enhanced flexibility in network design by allowing various switches to be managed by a master switch while at the same to be located at different locations or to be connected using a variety of network topologies. And, some embodiments of the invention allow for a virtually unlimited number of switches that can be connected to and managed by a master switch. In addition, some embodiments of the invention provide enhanced management flexibility by facilitating the ability of a user to select and configure a switch as a master switch and by allowing for multiple master switches at a given time.

It should be recognized that the specific embodiments of the invention discussed above are merely exemplary, and various other embodiments are encompassed by the present invention.

For instance, an embodiment of the invention may include a help system, including a wizard that provides assistance to users, for configuring a computer network (e.g., the computer network 100) and its various components.

An embodiment of the present invention relates to a computer storage product with a non-transitory computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher level code that are executed by a computer using an interpreter. For example, an embodiment of the invention may be implemented using Java, C++, or other object-oriented programming language and development tools.

Another embodiment of the invention may be implemented in hardwired circuitry in place of, or in combination with, machine-executable software instructions.

While the present invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, process step or steps, to the objective, spirit and scope of the present invention. All such modifications are intended to be within the scope of the claims appended hereto. In particular, while the methods disclosed herein have been described with reference to particular steps performed in a particular order, it will be understood that these steps may be combined, sub-divided, or re-ordered to form an equivalent method without departing from the teachings of the present invention. Accordingly, unless specifically indicated herein, the order and grouping of the steps is not a limitation of the present invention.

What is claimed is:

1. A non-transitory computer-readable storage medium storing computer instructions to function in a specified manner, said computer instructions comprising:

instructions to configure a first switch of a set of switches as a first master switch;

wherein said instructions to configure said first switch include:

instructions to display an user-interface indicating a plurality of switch states associated with said first switch, said plurality of switch states including a master switch state associated with said first switch and a slave state associated with said first switch; and instructions to receive, via said user-interface, a user-specified selection of said master switch state associated with said first switch to configure said first switch as said first master switch;

instructions to identify a first plurality of switches of said set of switches that are connected to said first master switch, said first plurality of switches including a second switch and a third switch, instructions to modify a first operational parameter associated with said third switch using said first master switch, such that said third switch performs switching operations in accordance with said modified first operational parameter;

instructions to configure, using said first master switch, said second switch being configured as a second master switch while said first switch remains configured as said first master switch, wherein said instructions to configure said second switch include:

instructions to identify said second switch as being in a slave switch state associated with said second switch; and instructions to configure, using said first master switch, said slave switch state associated with said second switch to a master switch state associated with said second switch;

instructions to identify a second plurality of switches of said set of switches that are connected to said second master switch, said second plurality of switches including said first switch and said third switch; and instructions to modify a second operational parameter associated with said third switch using said second master switch, such that the third switch performs switching operations in accordance with said modified second operational parameter.

2. The non-transitory computer-readable storage medium of claim 1, wherein said instructions to identify said first plurality of switches of said set of switches that are connected to said first master switch include:

instructions to identify at least 16 switches of said set of switches that are connected to said first master switch.

3. The non-transitory computer-readable storage medium of claim 1, further comprising:

instructions to modify a third operational parameter associated with said second master switch using said first master switch.

4. The non-transitory computer-readable storage medium of claim 1, wherein said instructions to identify said first plurality of switches that are connected to said first master switch include:
instructions to direct said first master switch to transmit a polling signal to said third switch and to receive an acknowledgment signal, transmitted in response to said polling signal, from said third switch.

5. The non-transitory computer-readable storage medium of claim 4, wherein at least one of said polling signal and said acknowledgement signal is incorporated in an Ethernet frame.

6. The non-transitory computer-readable storage medium of claim 1, wherein said instructions to modify said first operational parameter associated with said third switch include:
instructions to direct said first master switch to transmit, in response to an user-specified selection of said third switch, an access request signal to said third switch and to receive an access response signal, transmitted in response to said access request signal, from said third switch.

7. The non-transitory computer-readable storage medium of claim 6, wherein at least one of said access request signal and said access response signal is incorporated in an Ethernet frame.

8. The non-transitory computer-readable storage medium of claim 1, wherein said instructions to modify said first operational parameter associated with said third switch include:
instructions to direct said first master switch to transmit data associated with said first operational parameter to said third switch.

9. The non-transitory computer-readable storage medium of claim 8, wherein said data is incorporated in an Ethernet frame.

10. A method of managing a computer network, comprising:
providing a stack of Ethernet switches;
configuring a first Ethernet switch of said stack of Ethernet switches as a first master switch;
configuring, using said first master switch, a second Ethernet switch of said stack of Ethernet switches as a second master switch while said first Ethernet switch remains configured as said first master switch, wherein said configuring said second Ethernet switch includes:
displaying, in a user-interface screen associated with said first master switch, a switch state of said second Ethernet switch as corresponding to a slave switch state;
displaying, in said user-interface screen, an option corresponding to a master switch state; and
receiving user input to select said option to modify said switch state of said second Ethernet switch from said slave switch state to said master switch state;
receiving an user-specified selection of one of said first master switch and said second master switch; and
modifying an operational parameter associated with a third Ethernet switch of said stack of Ethernet switches using said selected one of said first master switch and said second master switch, wherein said operational parameter is associated with one or more switching operations performed by said third Ethernet switch.

11. The method of claim 10, further comprising:
identifying a plurality of Ethernet switches of said stack of Ethernet switches that are connected to said selected one of said first master switch and said second master switch, said plurality of Ethernet switches including said third Ethernet switch.

12. The method of claim 10, wherein modifying said operational parameter associated with said third Ethernet switch includes:
transmitting data associated with said operational parameter between said third Ethernet switch and said selected one of said first master switch and said second master switch, said data being incorporated in an Ethernet frame.

13. The method of claim 10, further comprising:
configuring said third Ethernet switch as a slave switch.

14. The method of claim 10, further comprising:
connecting said first Ethernet switch, said second Ethernet switch, and said third Ethernet switch using a cascade topology.

15. The method of claim 10, wherein said operational parameter corresponds to one of an operating speed of a port included in said third Ethernet switch, a duplex mode of said port, an auto-negotiation status setting of said port, a flow control setting of said port, and a security setting of said port.

16. The method of claim 10, wherein said operational parameter corresponds to a Virtual Local Area Network configuration parameter.

17. The method of claim 10, wherein said operational parameter corresponds to a Spanning Tree Protocol configuration parameter.

18. The method of claim 10, wherein said operational parameter corresponds to an Internet Protocol configuration parameter.

* * * * *